United States Patent [19]

Olson

[11] Patent Number: 5,370,474
[45] Date of Patent: Dec. 6, 1994

[54] CHAIR LEG FASTENER

[76] Inventor: Arthur E. Olson, 127 Cliffview Dr., North East, Md. 21921

[21] Appl. No.: 52,466

[22] Filed: Apr. 26, 1993

[51] Int. Cl.⁵ ............................................. B25G 3/00
[52] U.S. Cl. ................................ 403/405.1; 403/187; 403/188; 403/273
[58] Field of Search .................. 403/405.1, 406.1, 188, 403/187, 199, 273, 266

[56] References Cited

U.S. PATENT DOCUMENTS

| | | |
|---|---|---|
| 208,768 | 10/1878 | Sorenson . |
| 230,117 | 7/1880 | Farum . |
| 239,246 | 3/1881 | Heavener . |
| 352,756 | 11/1886 | Hurley . |
| 374,997 | 12/1887 | Remaly . |
| 501,564 | 7/1893 | Goodyear .................... 403/405.1 |
| 732,736 | 7/1903 | Gruenwald . |
| 845,156 | 2/1907 | Winchester .................. 403/406.1 |
| 1,001,265 | 8/1911 | Graham ........................ 403/406.1 |
| 1,710,911 | 4/1929 | Wittliff . |
| 3,028,184 | 4/1962 | Knowlton ..................... 403/406.1 |
| 4,027,454 | 6/1977 | Schuplin ........................ 403/273 |

*Primary Examiner*—John T. Kwon
*Attorney, Agent, or Firm*—E. Alan Uebler

[57] ABSTRACT

A chair leg fastener is provided for use in securing wooden chair legs and/or backs to the seat of chairs. The fastener effectively prevents the loosening of the joint between the chair seat and leg as a result of temperature or humidity changes, is simple to install, is economical and provides essentially permanent fastening.

6 Claims, 1 Drawing Sheet

CHAIR LEG FASTENER

BACKGROUND OF THE INVENTION

The invention relates to chairs, more specifically, wooden chairs having legs, a seat and a back.

In conventional wooden chair construction, the chair legs, normally cylindrical at their ends, are inserted into openings in the chair seat, after applying a glue or adhesive material into the opening, and allowed to set therein until the glue dries, thereby affixing the leg(s) to the seat. Owing to atmospheric changes in humidity and temperature, and the inherent sensitivity to such changes in both glue and wood, such a joint, over time, can and does become loose, necessitating disassembly, regluing, refitting and the process begins once again.

Various techniques for overcoming the problem of chair leg joint loosening are known. Exemplary of proposed solutions for this problem are found in U.S. Pat. Nos. 1,710,911 (Wittliff), 732,736 (Gruenwald), 374,997 (Remaly), 352,755 (Hurley), 239,246 (Heavenor), 230,117 (Farum) and 208,768 (Sorenson). These known techniques have been found to be cumbersome, ineffective and to detract from the pleasing aesthetics of the chair.

The present invention provides means whereby the loosening of joints common in wooden chairs as ordinarily constructed, due to the shrinkage of the material ordinarily used in the construction thereof, is overcome, simply, conveniently and presenting no detrimental change in the outward appearance of the chair.

SUMMARY OF THE INVENTION

A chair leg fastener is provided, especially useful in the fastening of a wooden chair leg to the seat of a chair, comprising integral insert means adapted to be affixed to a chair leg and to be inserted with said leg into an opening of a chair seat for receiving the chair leg. The insert means has a base attachable to the end of the leg and a generally vertical, gripping support member attached to or being integral with the base, the support member having, at its end remote from the base, gripping teeth adapted to resistively engage the wall of the opening of the chair seat after insertion of the leg and the attached insert means into the opening. Upon insertion of the leg and attached insert means into the opening, the chair leg is essentially permanently affixed to the chair seat.

Preferably, the chair leg fastener has engaging means extending inwardly from the support member adjacent the chair leg adapted to engage a notch placed in the chair leg, whereby the fastening of the chair leg to the seat is further enhanced. The chair leg fastener may be constructed of stainless steel, spring steel or plastic.

DETAILED DESCRIPTION OF THE INVENTION AND PREFERRED EMBODIMENTS WITH REFERENCE TO THE DRAWINGS

Figure 1:
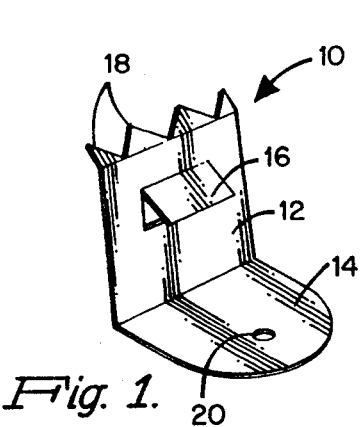
FIG. 1 is a perspective, elevational view of the chair fastening device according to the invention.

A chair leg fastener is provided for use in securing wooden chair legs and/or backs to the seat of chairs. The fastener effectively prevents the loosening of the joint between the chair seat and leg as a result of temperature or humidity changes, is simple to install, is economical and provides essentially permanent fastening. A detailed description of the invention and preferred embodiments is best provided with reference to the accompanying drawings, wherein FIG. 1 illustrates the device of the invention. In FIG. 1, the chair leg fastener 10, according to the invention, comprises base 14 and generally vertical, gripping support member 12 affixed to or extending from base 14 as shown. The support member 12 has, at its end remote from base 14, gripping teeth means 18 extending from support member 12 upwardly and angularly therefrom. The base 14 has opening 20 therein to permit fastening of the device 10 to the chair leg or back brace by means of a nail or screw or the like.

Also shown in FIG. 1 is optional engaging means 16 extending as shown from fastener support member 12. Engaging means 16 is adapted to engage a notch placed in the chair leg to be fastened, as described more fully below with reference to FIGS. 3 and 4.

Figure 2:
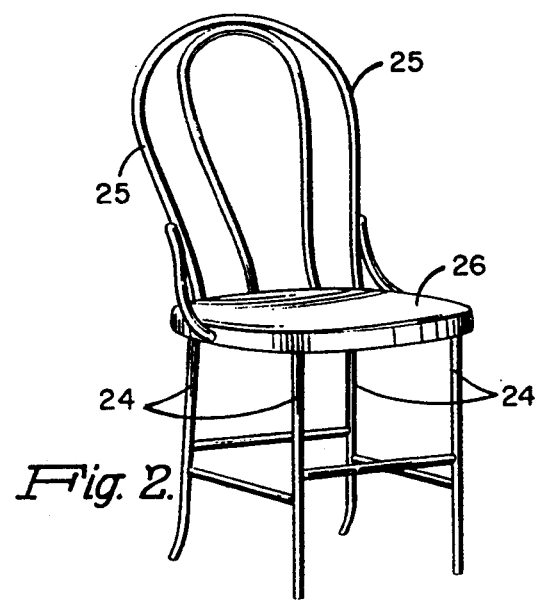
FIG. 2 is a schematic perspective view of a typical chair in which the device of the invention would be employed.

FIG. 2 is a perspective view of a typical chair in which the fastening device of the invention would be employed. In use, the device of the invention would be employed to permanently affix legs 24 and back supports 28 to the chair seat 26.

Figure 3:
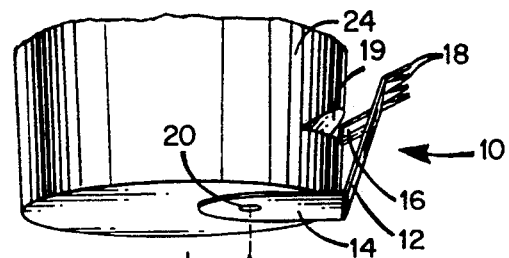
FIG. 3 is an exploded view of the components of the invention and the method of fastening of a chair leg to a chair seat.
Figure 3:
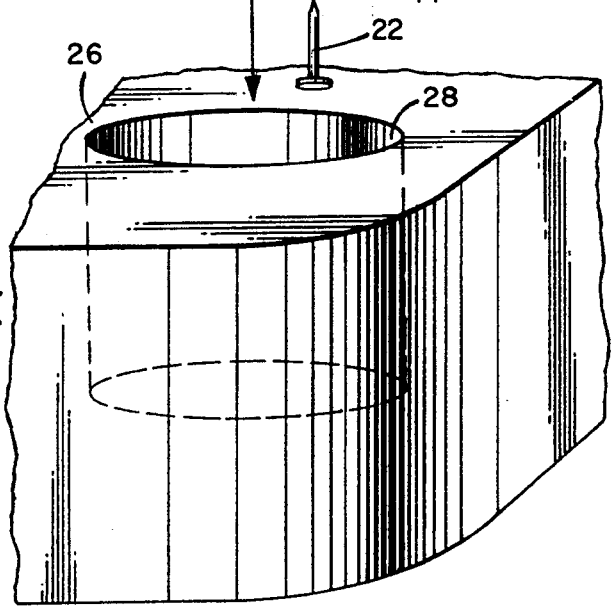

FIG. 3 is an exploded, perspective view of the fastening device be of the invention being applied to permanently affix a chair leg 24 to chair seat 26. The assembly is shown upside-down for convenience of illustration. In FIG. 3, the device be is shown being affixed to chair leg 24 by means of nail 22 extending through opening 20 in base 14 of the device 10. Vertical support member 12 extends generally vertically and upwardly from base 12 and engaging teeth 18 extend generally upwardly and angularly from support member 14, as shown. The optional engaging means 16 is adapted to and inserts into notch 19 in chair, leg 24. Once assembled as shown, the chair leg 24 and fastener the affixed thereto is inserted into opening 28 in chair seat 26, thereby providing an essentially permanent interlocking between leg and seat.

Figure 4:
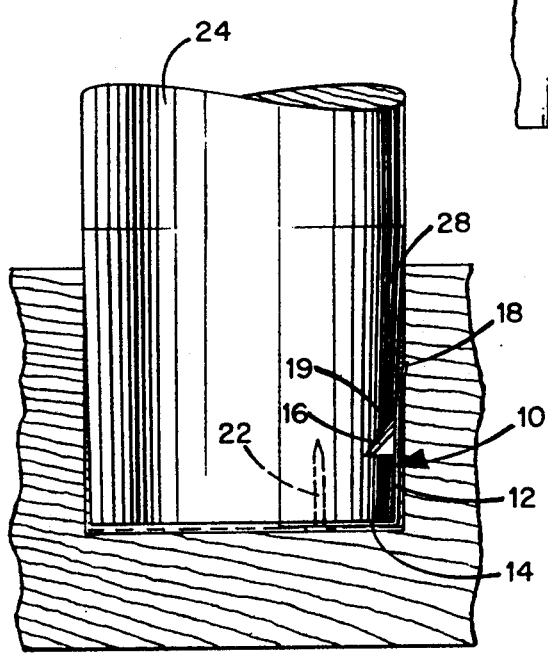
FIG. 4 is an elevational view, partly in cross-section, of a chair leg and seat fastened according to the principles of the invention.

FIG. 4 depicts, partly in cross-section, the final joint between chair and seat according to the invention. Therein, leg 24 with attached fastener 10 is shown inserted into opening 28 in chair seat 26. Fastener 10 is affixed to leg 24 by means of nail 22, shown in phantom, extending through the opening 20 in base of fastener 10. Vertical support member 12 is positioned between leg 24 and the wall of opening 28 such that teeth 18 engage the wall of opening 28 and resist loosening of joint therebetween. Optional engaging means 16 engage notch 19 as shown and further resist loosening of the joint. As a result of fastener 10 securing the leg 24 into the opening 28 of seat 26, an essentially permanent joint is achieved.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A chair leg fastener, useful in the fastening of a wooden chair leg to the seat of a chair, comprising integral insert means adapted to be affixed to a chair leg and to be inserted with said leg into an opening of a chair seat for receiving said leg, said insert means having a base attachable to the end of said leg and a generally vertical, gripping support member attached to and being integral with said base, said support member having, at its end remote from said base, gripping teeth extending upwardly and angularly therefrom adapted to resistively engage the wall of said opening of said chair after insertion of said leg with said insert means into said opening, whereby, upon insertion of said leg and attached insert means into said opening, said leg is essentially permanently affixed to said seat.

2. The chair leg fastener Of claim 1, said support member having engaging means extending inwardly therefrom adjacent said chair leg and adapted to engage a notch placed in said chair leg, whereby the fastening of said chair leg to said seat is further enhanced.

3. The chair leg fastener of claim 1 constructed of stainless steel.

4. The chair leg fastener of claim 1 constructed of spring steel.

5. The chair leg fastener of claim 1 constructed of carbon annealed spring steel.

6. The chair leg fastener of claim 1 constructed of plastic.

* * * * *

UNITED STATES PATENT AND TRADEMARK OFFICE
CERTIFICATE OF CORRECTION

PATENT NO. : 5,370,474
DATED : December 6, 1994
INVENTOR(S) : Arthur E. Olson

It is certified that error appears in the above-identified patent and that said Letters Patent is hereby corrected as shown below:

Col. 2, l. 36, "be" should read --10--;

Col. 2, l. 39, "be" should read --10--;

Col. 2, l. 46, delete ",", first occurrence;

Col. 2, l. 47, "the" should read --10--.

Signed and Sealed this

Eleventh Day of April, 1995

Attest:

BRUCE LEHMAN

Attesting Officer     Commissioner of Patents and Trademarks